(12) United States Patent
Swope et al.

(10) Patent No.: US 7,792,640 B2
(45) Date of Patent: Sep. 7, 2010

(54) ALTITUDE CORRECTION OF A NAVIGATIONAL DEVICE

(75) Inventors: Charles B. Swope, Coral Springs, FL (US); Daniel A. Tealdi, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 687 days.

(21) Appl. No.: 11/551,169

(22) Filed: Oct. 19, 2006

(65) Prior Publication Data

US 2007/0093962 A1 Apr. 26, 2007

Related U.S. Application Data

(60) Provisional application No. 60/729,665, filed on Oct. 24, 2005.

(51) Int. Cl.
*G06F 17/00* (2006.01)
(52) U.S. Cl. .......................... 701/220; 702/176; 73/384
(58) Field of Classification Search .................. 701/220, 701/221; 702/138, 176; 73/384; 368/11; *G06F 17/00*
See application file for complete search history.

(56) References Cited

U.S. PATENT DOCUMENTS

| | | | | |
|---|---|---|---|---|
| 5,210,540 | A * | 5/1993 | Masumoto | 342/357.11 |
| 5,652,592 | A * | 7/1997 | Sanderford et al. | 342/385 |
| 6,529,827 | B1 * | 3/2003 | Beason et al. | 701/213 |
| 6,647,352 | B1 * | 11/2003 | Horton | 702/151 |
| 6,694,260 | B1 * | 2/2004 | Rekow | 701/214 |
| 6,819,983 | B1 * | 11/2004 | McGraw | 701/4 |
| 7,098,809 | B2 | 8/2006 | Feyereisen et al. | |
| 7,403,853 | B1 * | 7/2008 | Janky et al. | 701/220 |
| 2002/0126041 | A1 | 9/2002 | Hedrick | |
| 2002/0177782 | A1 | 11/2002 | Penner | |
| 2003/0023399 | A1 * | 1/2003 | Yun | 702/138 |
| 2004/0267444 | A1 * | 12/2004 | Coatantiec et al. | 701/202 |
| 2005/0065728 | A1 * | 3/2005 | Yang et al. | 701/220 |
| 2006/0069469 | A1 * | 3/2006 | Campbell et al. | 701/4 |
| 2006/0247828 | A1 * | 11/2006 | Ardila et al. | 701/3 |
| 2007/0093962 | A1 * | 4/2007 | Swope et al. | 701/220 |

OTHER PUBLICATIONS

PCT/US06/41145—International Search Report mailed Oct. 5, 2007—7 pages.
PCT/US2006/041145, PCT Preliminary Report on Patentability mailed May 8, 2008, 5 pages.
Australian Patent Office, Australian Application No. 2006306409, Examiner's First Report (Objections), Aug. 12, 2009, 2 pages.

* cited by examiner

*Primary Examiner*—Tuan C To
(74) *Attorney, Agent, or Firm*—Barbara R. Doutre

(57) ABSTRACT

A method of altitude correction of an inertial navigational device, the method comprising the steps of: receiving (205) a relative altitude of the inertial navigational device; obtaining (210) a rate of change of the relative altitude of a reference device; and calculating (215) an absolute altitude of the inertial navigational device based on the relative altitude of the inertial navigational device and the rate of change of the relative altitude of the reference device. The invention also provides for a device (505) such as base station, computer or a laptop to enable altitude correction of an inertial navigational device.

14 Claims, 3 Drawing Sheets

ALTITUDE CORRECTION OF A NAVIGATIONAL DEVICE

CROSS-REFERENCE TO RELATED APPLICATIONS

This application claims benefit under 35 U.S.C. §119(e) from U.S. Provisional Patent Application Ser. No. 60/729,665, filed Oct. 24, 2005, the contents of which is incorporated herein by reference.

FIELD OF THE INVENTION

The present invention relates generally to correcting an altitude reading of an inertial navigational device and more specifically, to obtaining an absolute altitude of the inertial navigational device using a relative altitude of the inertial navigational device and a rate of change in the relative altitude of a reference device.

BACKGROUND OF THE INVENTION

Often times a location of a user within a predefined area (e.g. a building) needs to be monitored. For example, the user may be fire personnel within a building and monitoring the fire personnel's location in the building may be necessary. To accurately estimate the user's location in the building, an altitude of the user needs to be calculated. Most existing inertial navigational devices use barometric pressure sensors to aid in the estimation of altitude. One such example is Motorola's Precision Inertial Navigation Systems (PINS) prototype Personal Tracking Device (PTD). In such existing inertial navigational devices, altitude data of the user is recorded at the inertial navigational device and communicated to a remote device where the remote device estimates the location of the user.

Because altitude data is recorded at the inertial navigational device, as barometric conditions change or shift (for example as a cold front moves through), existing navigational devices cannot compensate for local pressure changes and can confuse local pressure changes with changes in the altitude of the inertial navigational device. Not compensating for local pressure changes causes errors in estimating altitude of the inertial navigational device. Not being able to accurately estimate altitude of the inertial navigational device means that the location of the user (e.g. fire personnel) is mistaken.

Thus, there exists a need for a new way to correct altitude of a navigational device.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF THE INVENTION

Figure 1:
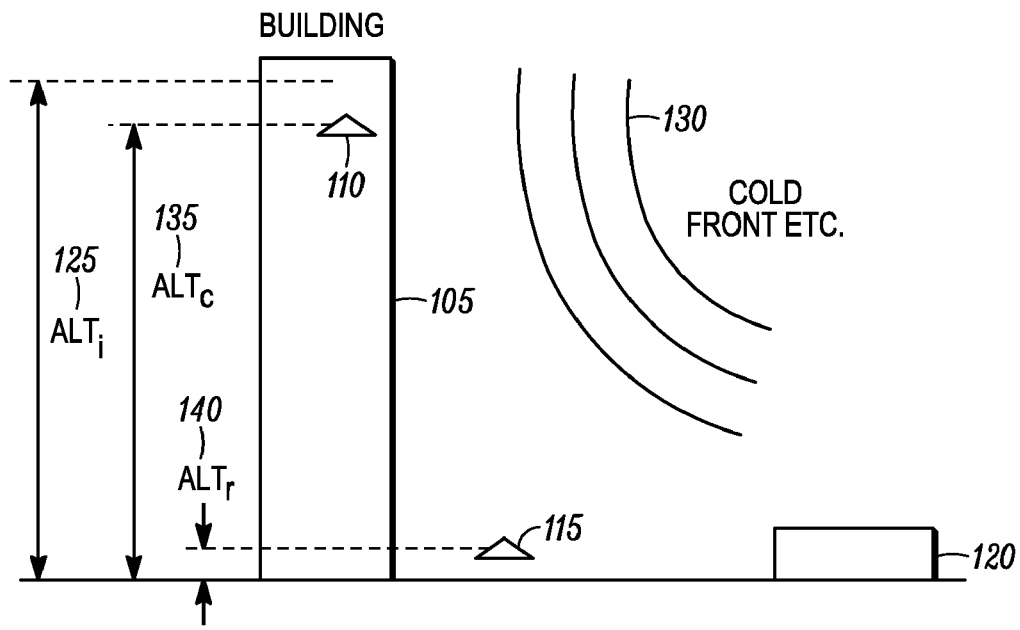
FIG. 1 illustrates a block diagram of an exemplary embodiment of the present invention in accordance with the embodiments of the present invention.

Before describing in detail embodiments that are in accordance with the present invention, it should be observed that the embodiments reside primarily in combinations of method steps and apparatus components related to a method and apparatus for altitude correction of a navigational device. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

In this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being "close to" as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that embodiments of the invention described herein may be comprised of one or more conventional processors and unique stored program instructions that control the one or more processors to implement, in conjunction with certain non-processor circuits, some, most, or all of the functions of the method and apparatus for altitude correction of a navigational device. The non-processor circuits may include, but are not limited to, a radio receiver, a radio transmitter, signal drivers, clock circuits, power source circuits, and user input devices. As such, these functions may be interpreted as steps of a method to perform altitude correction of a navigational device. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Generally speaking, pursuant to the various embodiments, the invention provides a method and apparatus for obtaining an absolute altitude of an inertial navigational device using a relative altitude of the inertial navigational device and a rate of change in the relative altitude of a reference device.

Referring now to the drawings, and in particular to FIG. 1, a block diagram illustrating an embodiment of the present invention is shown in accordance with the embodiments of the present invention. Those skilled in the art, however, will recognize and appreciate that the specifics of this illustrative example are not specifics of the invention itself and that the teachings set forth herein are applicable in a variety of alternative settings. For example, since the teachings described do not depend on the number of inertial navigational devices or predefined areas, they can be applied to any number of inertial navigational devices or predefined areas although only one inertial navigational device within one predefined area is shown in this embodiment. As such, other alternative implementations of using any arbitrary number of inertial navigational devices and predefined areas are contemplated and are within the scope of the various teachings described.

Referring back to FIG. 1, a predefined area 105 is shown. For illustrative purposes, the predefined area 105 is a building. However, those skilled in the art shall appreciate that a predefined area can be any area bounded in some manner (e.g. by walls). In the predefined area 105, a user may have an inertial navigational device 110 and the user may be moving in the predefined area 105 with the inertial navigational device 110. As is known to one of ordinary skill in the art, an inertial navigational device 110 is generally referred to as a personal tracking device. In any case, an inertial navigational device is any device that determines a location of a user or object while the device is in motion.

In one embodiment, a reference device 115 is also located in a vicinity of the inertial navigational device 110, e.g. within the predefined area 105 where the inertial navigational device 110 is moving. The reference device 115 is in communication with a remote device 120 where the remote device 120 determines altitude correction. The remote device 120 can be for example, a base station, a personal computer, a laptop or a personal digital assistant. In another embodiment, the reference device 115 can also be located at the remote device 120. In any case, the reference device 115 serves as a reference where the absolute altitude of the reference device 115 is known.

In order to show a practical example of various teachings, FIG. 1 is shown with a single inertial navigational device 110 inside a predefined area 105. However, more than one inertial navigational device can be located in the predefined area 105 or more than one predefined area can be associated with the remote device 120, which is readily appreciated by one skilled in the art.

In accordance with an embodiment of the present invention, in order to perform altitude correction of an inertial navigational device 110, first a relative altitude of the inertial navigational device 110 is determined. The relative altitude of the inertial navigational device 110 can be determined by the inertial navigational device 110. As shown in FIG. 1, $Alt_i$ 125 is the relative altitude of the inertial navigational device 110. In one embodiment, the inertial navigational device 110 determines the relative altitude and sends it to the remote device 120. As is known to one of ordinary skill in the art, the relative altitude $Alt_i$ 125 of the inertial navigational device 110 may be an incorrect estimate of the absolute altitude of the inertial navigational device 110 because climatic influences may obscure the determination that the inertial navigational device 110 makes of the absolute altitude. As used herein, climatic influences include variables such as pressure, temperature, precipitation, wind, and humidity. In any case, climatic influences affect the inertial navigational devices' determination of absolute attitude.

For example, shown in FIG. 1 is a cold front 130 approaching the predefined area 105. The cold front 130 can cause a change in the climatic influences, e.g. temperature and pressure, at the inertial navigational device 110, which can lead to an incorrect determination of the absolute altitude of the user. Similarly, other phenomenon such as a hot front, stormy weather and humidity can also cause changes in climatic influences, e.g. temperature and pressure, which may lead to an incorrect determination of the absolute altitude of an inertial navigational device 110.

After determining a relative altitude of the inertial navigational device 110, an absolute altitude, $Alt_c$ 135, of the inertial navigational device needs to be calculated. As used herein, the absolute altitude of the inertial navigational device 110 is an altitude of the inertial navigational device 110 with respect to ground. In any case, calculating an absolute altitude of the inertial navigational device 110 assists to track a position of a user associated with the inertial navigational device 110. For example, in case of a fire in a high-rise building, the fire personnel on the ground may need to track the position of fire personnel inside the building. The inertial navigational devices on the fire personnel inside the building can send their relative altitude to a remote device (e.g. 120) on the ground so that the fire personnel on the ground can determine the absolute altitudes of the fire personnel in the building.

Figure 2:
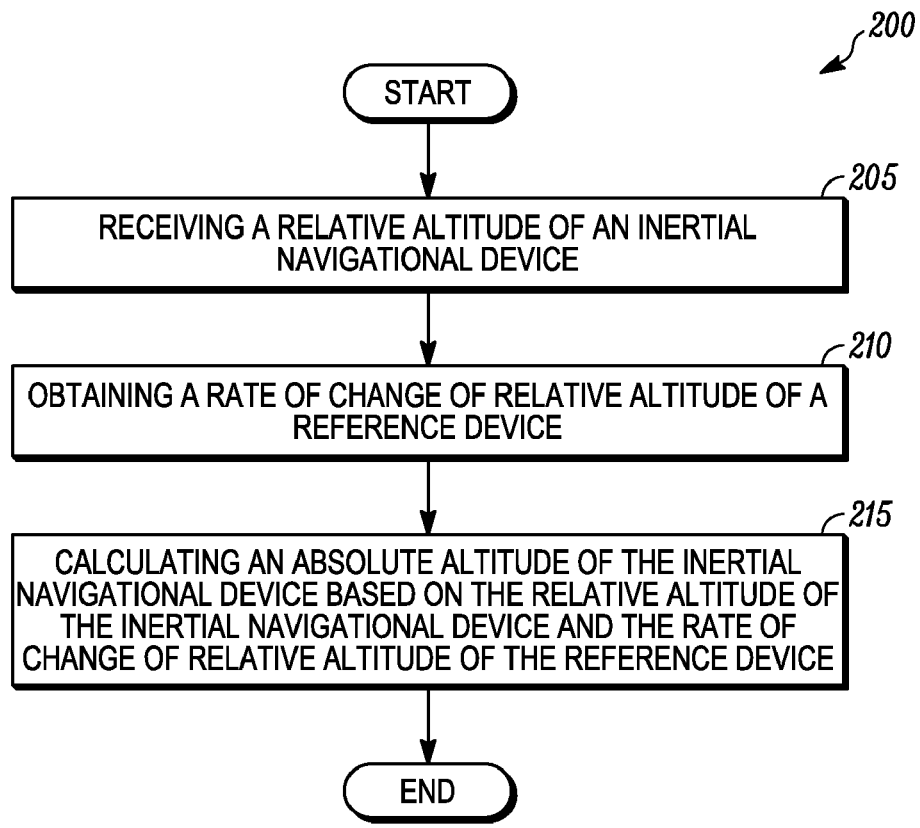
FIG. 2 illustrates a flow diagram for a method of altitude correction of an inertial navigational device in accordance with the embodiments of the present invention.

Turning now to FIG. 2, a flow diagram for a method of altitude correction of an inertial navigational device 110 is shown in accordance with an embodiment of the present invention. A relative altitude $Alt_i$ 125 of an inertial navigational device 110 is calculated at the inertial navigational device 110. As mentioned above, the relative altitude $Alt_i$ 125 of the inertial navigational device 110 may be calculated incorrectly due to climatic influences. As is known in the art, the relative altitude is generally calculated based on temperature and pressure at the inertial navigational device. In one embodiment, the remote device 120 receives the relative altitude $Alt_i$ 125 of the inertial navigational device 110 from the inertial navigational device 110, step 205.

In order to determine the absolute altitude $Alt_c$ 135 of the inertial navigational device 110, the remote device 120 makes use of a reference device 115. A rate of change of the relative altitude $Alt_r$ 140 of the reference device 115 is obtained at the remote device 120, step 210, from the reference device 115 (described below). Then, the absolute altitude $Alt_c$ 135 of the inertial navigational device 110 is calculated at the remote device 120 based on the relative altitude $Alt_i$ 125 of the inertial navigational device 110 and the rate of change of the relative altitude $Alt_r$ 140 of the reference device 115, step 215. More specifically, the absolute altitude $Alt_c$ 135 of the inertial navigational device 110 can be calculated based on the difference between the relative altitude $Alt_i$ 125 of the inertial navigational device 110 and the rate of change of relative altitude $Alt_r$ 140 of the reference device 115. In any case, once the absolute altitude of the inertial navigational device 110 is calculated In one embodiment, once the absolute altitude of the inertial navigational device 110 is calculated, a calibration error of the inertial navigational device 110 can also be accounted for by including an altitude calibration factor corresponding to the inertial navigational device 110 while calculating the absolute altitude $Alt_c$ 135 of the inertial navigational device 110. That is, in one embodiment, the relative altitude of inertial navigational device 110 may be adjusted by the altitude calibration factor corresponding to the inertial navigational device 110. Those skilled in the art shall appreciate that the altitude calibration factor can differ from one inertial navigational device to another.

Figure 3:
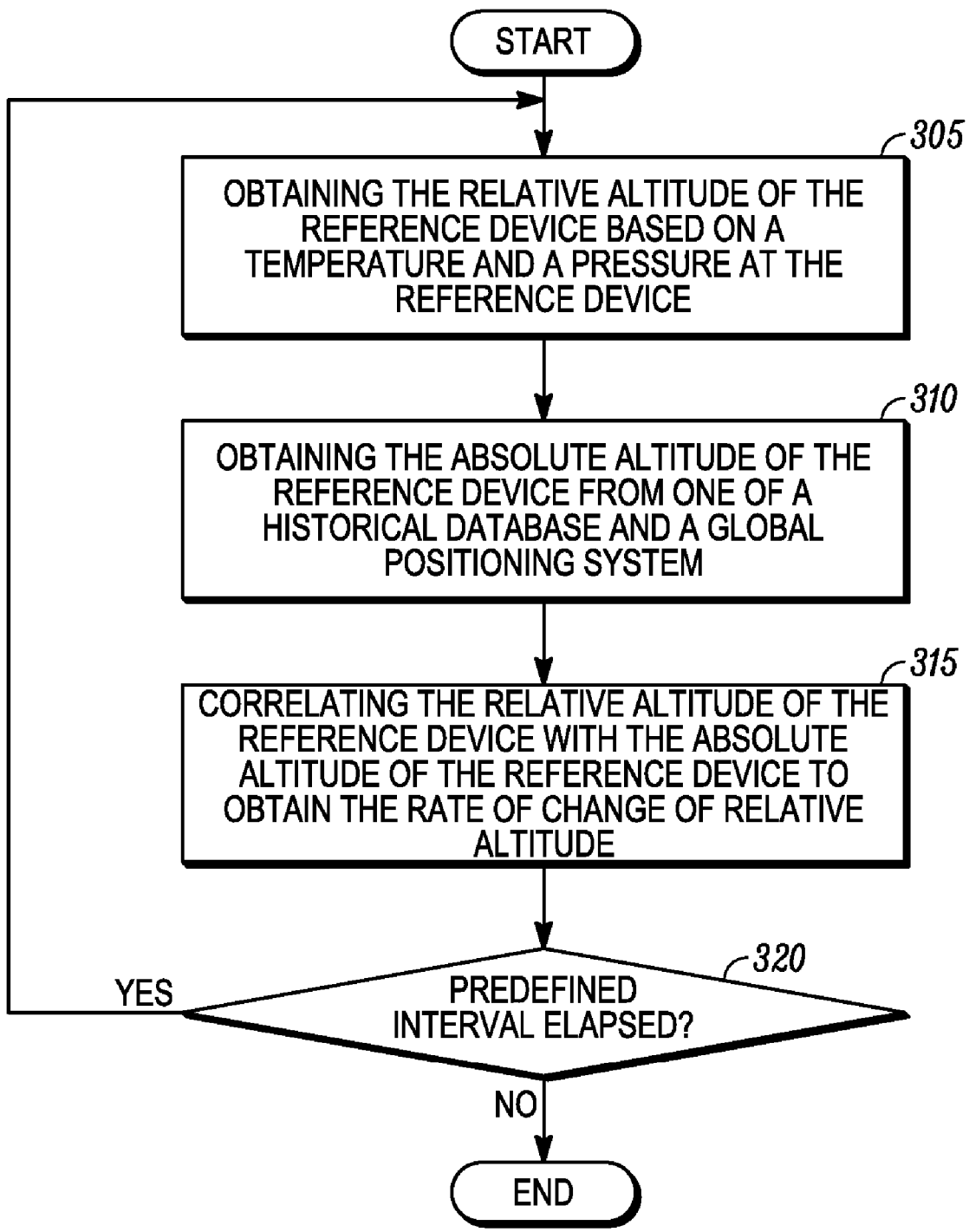
FIG. 3 illustrates a flow diagram for a method of determining a rate of change of the relative altitude of a reference device in accordance with the embodiments of the present invention.

Turning now to FIG. 3, a flow diagram of a method of determining a rate of change of the relative altitude of the reference device 115 in accordance with one embodiment of the present invention is shown. As such, determining a rate of change of the relative altitude of the reference device 115 is based upon the climatic influences of temperature and pressure. Specifically, a relative altitude $Alt_r$ 140 of the reference device 115 may be obtained based on the temperature and pressure at the reference device 115, step 305. A change in the relative altitude $Alt_r$ 140 of the reference device 115 can be caused due to a change in the pressure or a change in the temperature at the reference device 115, e.g. due to the cold front 130 shown in FIG. 1. Then, the absolute altitude of the reference device 115 is obtained from either a historical database or a highly accurate global positioning system, step 310. Knowing the absolute altitude of the reference device 115, the relative altitude $Alt_r$ 140 of the reference device 115 and the absolute altitude of the reference device 115 can be correlated to obtain the rate of change of relative altitude $Alt_r$ 140 of the reference device 115, step 315. As is known, this correlation may take place at either the remote device 120 or at the reference device 115.

Where the reference device 115 and the inertial navigational device 110 are in close vicinity, the rate of change of relative altitude $Alt_r$ 140 of the reference device 115 may be the same as the rate of change of relative altitude $Alt_i$ 125 of the inertial navigational device 110, since a pressure change or a temperature change can affect the reference device 115 and the inertial navigational device 110 to the same extent when the two are in close vicinity. For example, the cold front 130 shown in FIG. 1 may cross the reference device 115 and inertial navigational device 110 at approximately the same time and cause a same amount of change in the relative altitude of the reference device 115 $Alt_r$ 140, and the relative altitude of the inertial navigational device $Alt_i$ 125, since the reference device 115 and the inertial navigational device 110 are within close vicinity of each other.

In one embodiment of the present invention, the rate of change of the relative altitude $Alt_r$ 140 of the reference device 115 can be calculated on a periodic basic, since the rate of change of relative altitude $Alt_r$ 140 of the reference device 115 can change depending on the temperature or pressure conditions. Thus, after predefined intervals, step 320, the rate of change of relative altitude $Alt_r$ 140 of the reference device 115 can be recalculated. As previously mentioned, the rate of change of relative altitude $Alt_r$ 140 of the reference device 115 may be calculated at the remote device 120 or at the reference device 115.

Figure 4:
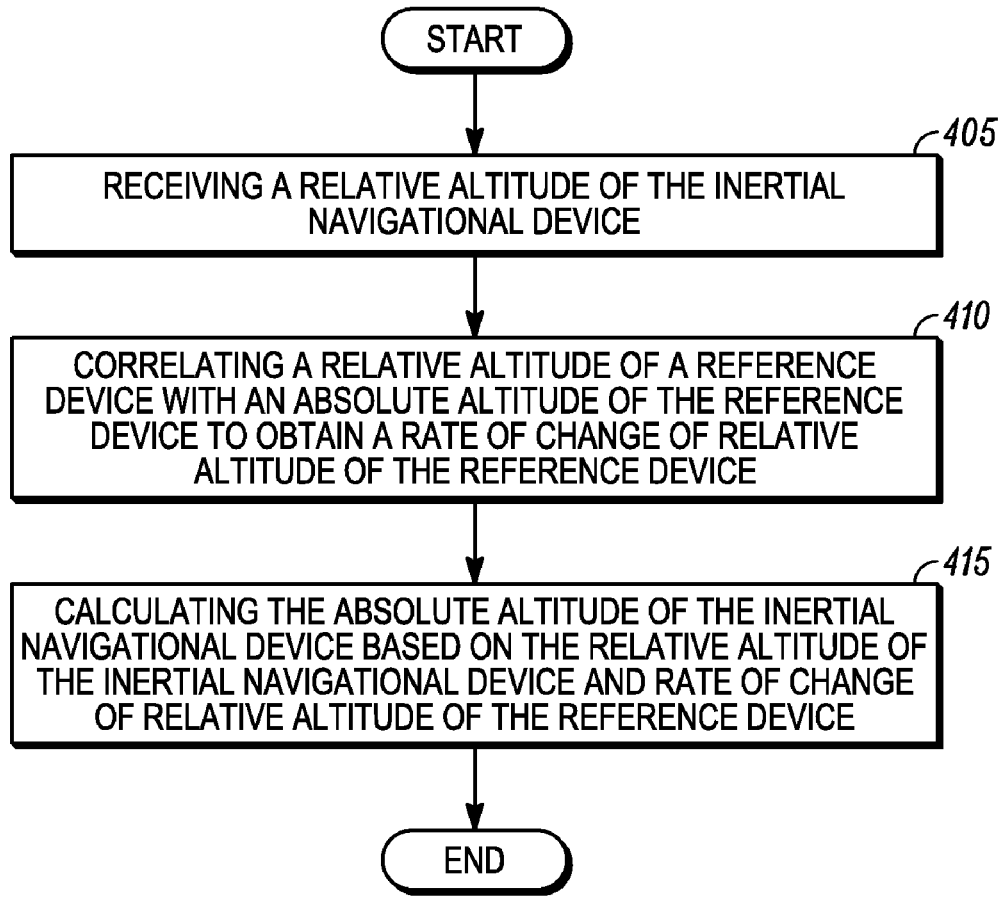
FIG. 4 illustrates a flow diagram for a method of altitude correction of an inertial navigational device in accordance with the embodiments of the present invention.

Turning now to FIG. 4, a flow diagram of a method of altitude correction of an inertial navigational device 110 is illustrated in accordance with an embodiment of the present invention. As such, altitude correction is described with reference to the climatic influences of temperature and pressure. Specifically, the relative altitude $Alt_i$ 125 of the inertial navigational device 110 is determined at the inertial navigational device 110 based on temperature and pressure at the inertial navigational device 110. As such, the relative altitude $Alt_i$ 125 of the inertial navigational device 110 is represented as a function of temperature and pressure and can be given by:

$$Alt_i = \int_n F(P_i, T_i) dP dT$$

where, $Alt_i$: relative altitude of the inertial navigational device 110;

$F(P_i, T_i)$: a function of $P_i$ and $T_i$;

$P_i$: pressure at the inertial navigational device 110;

$T_i$: temperature at the inertial navigational device 110.

As mentioned above, the calculation for the relative altitude $Alt_i$ 125 of the inertial navigational device 110 may be done at the inertial navigational device 110 and sent to a remote device 120, step 405.

For the purpose of determining the absolute altitude $Alt_c$ 135 of the inertial navigational device 110, a reference device 115 with a predetermined absolute altitude may be used, as mentioned above. A relative altitude $Alt_r$ 140 of a reference device 115 is correlated with an absolute altitude of the reference device 115 (known, as mentioned above) to obtain a rate of change of the relative altitude $Alt_r$ 140 of the reference device 115, step 410. In one embodiment, the relative altitude $Alt_r$ 140 of the reference device 115 can be determined at the reference device 115 based on temperature and pressure using a function given by:

$$Alt_r = \int_m F(P_r, T_r) dP dT$$

where, $Alt_r$: relative altitude of the reference device 115;

$F(P_r, T_r)$ a function of $P_r$ and $T_r$;

$P_r$: pressure at the reference device 115;

$T_r$: temperature at the reference device 115.

The rate of change of the relative altitude $Alt_r$ 140 of the reference device 115 can be given by:

$$\frac{dAlt_r}{dt}$$

However, as mentioned earlier, according to one embodiment of the present invention, the reference device 115 and the inertial navigational device 110 can be in close vicinity of each other and, thus, a temperature change or a pressure change will cause substantially the same amount of rate of change in the relative altitudes of the reference device 115 and the inertial navigational device 110. Thus, the rate of change of relative altitude $Alt_i$ 125 of the inertial navigational device 110 may be the same as the rate of change of the relative altitude $Alt_r$ 140 of the reference device 115. Thus, $$\frac{dAlt}{dt} = \frac{dAlt_r}{dt} = \frac{dAlt_i}{dt}$$

Because the rate of change of the relative altitude $Alt_r$ 140 of the reference device 115 and the rate of change of the relative altitude $Alt_i$ 125 of the inertial navigational device 110 are the same, the rate of change can be determined either at the reference device 115 or the remote device 120. In one embodiment of the present invention, the rate of change of relative altitude $Alt_r$ 140 of the reference device 115 may be calculated after every predefined interval since the rate of change of relative altitude $Alt_r$ 140 of the reference device 115 may change depending on the temperature and pressure conditions at the reference device 115. Further, the rate of change of relative altitude $Alt_i$ 125 of the inertial navigational device 110 may also be the same if both are in close vicinity of each other.

The absolute altitude $Alt_c$ 135 of the inertial navigational device 110 may, then, be calculated based on the relative altitude $Alt_i$ 125 of the inertial navigational device 110 and the rate of change of relative altitude $Alt_r$ 140 of the reference device 115, step 415. Calibration error at the inertial navigational device 110 can be accounted for by compensating for the calibration error while calculating the absolute altitude $Alt_c$ 135 of the inertial navigational device 110. The compensation for the calibration error can be done by including an altitude calibration factor corresponding to the inertial navigational device 110 while calculating the absolute altitude $Alt_c$ 135 of the inertial navigational device 110. A generalized formula used for calculating the absolute altitude $Alt_c$ 135 of the inertial navigational device 110 is given by:

$$Alt_c = Alt_i - \left(Alt_r + \frac{dAlt}{dt}\Delta t\right) - Alt_{cal}$$

where,
$Alt_c$: absolute altitude of the inertial navigational device 110;
$Alt_{cal}$: altitude calibration factor for the inertial navigational device 110.

The absolute altitude $Alt_c$ 135 of the inertial navigational device 110 can be calculated at the remote device 120 and sent back to the inertial navigational device 110. In such a manner, a user of the inertial navigational device 110 can be informed about his precise altitude.

Figure 5:
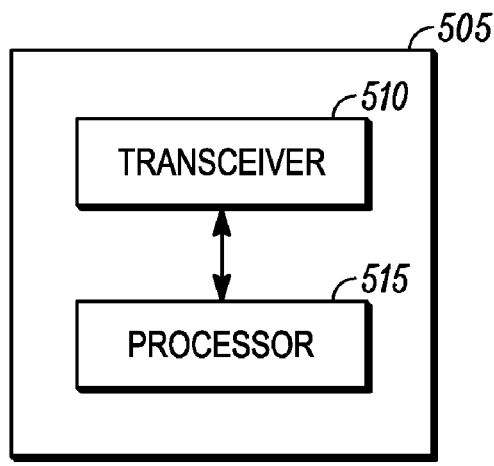
FIG. 5 illustrates a block diagram of a device for altitude correction of an inertial navigational device in accordance with the embodiments of the present invention.

Turning now to FIG. 5, a block diagram of a device for altitude correction of an inertial navigational device 110 is shown in accordance with the embodiments of the present invention and is indicated generally at 505. The device 505 can be a base station, a laptop, a personal computer or a personal digital assistant. The device comprises a transceiver 510 that is operatively coupled to a processor 515. The transceiver 510 enables the device 505 to communicate with devices such as reference devices and inertial navigational devices that are located in a predefined area. Those skilled in the art shall appreciate that the transceiver 510 can be in communication with more than one inertial navigational device or more than one reference device at a time.

A database containing information corresponding to a selected set of predefined areas can be stored on the device 505 and can be retrieved as and when required by the processor 515. A relative altitude $Alt_i$ 125 of the inertial navigational device 110 is received at the device 505. The relative altitude $Alt_i$ 125 of the inertial navigational device 110 can be adjusted by an altitude calibration factor corresponding to the inertial navigational device 110. The altitude calibration factor can be different for different inertial navigational devices. The altitude calibration factor can be an offset, for example a distance, or a gain such as an angle. According to one embodiment of the present invention, the altitude calibration factor can be a real-time adjustment made at the device 505.

The rate of change of relative altitude $Alt_r$ 140 of the reference device 115 can be calculated at the device 505. In one embodiment of the present invention, the device 505 is adapted for correlating relative altitude $Alt_r$ 140 of the reference device 115 with an absolute altitude of the reference device 115 to obtain the rate of change of relative altitude $Alt_r$ 140. The absolute altitude of the reference device 115 can be obtained from a historical database or a highly accurate global positioning system. The processor 515 is adapted for calculating an absolute altitude $Alt_i$ 135 of the inertial navigational device 110 based on the relative altitude $Alt_i$ 125 of the inertial navigational device 110 and the rate of change of relative altitude $Alt_r$ 140 of the reference device 115. The absolute altitude $Alt_c$ 135 of the inertial navigational device 110 can generally be the altitude of the inertial navigational device 110 with respect to ground. In one embodiment of the present invention, the absolute altitude $Alt_c$ 135 of the inertial navigational device 110 is sent back to the inertial navigational device 110 by the device for more precise measurements at the inertial navigational device 110.

In one embodiment, the device 505 can be coupled to a display, for example a computer screen, to provide a dimensional model of a predefined area 105 that an inertial navigational device, for example inertial navigational device 110, is roaming in. Those skilled in the art shall realize that the device 505 can store a database of more than one predefined area and a dimensional model corresponding to a predefined area, which an inertial navigational device under observation is moving in, can be retrieved. For example, a user carrying the inertial navigational device 110 can be moving inside a predefined area 105. The inertial navigational device 110 of the user sends its relative altitude $Alt_i$ 125 to the device 505 (which can be located in the remote device 120). The device 505 then communicates with a reference device 115, which is in the vicinity of the predefined area 105 that the user is moving in, and obtains a relative altitude $Alt_r$ 140 of the reference device 115. The device 505 can determine the rate of change of relative altitude $Alt_r$ 140 of the reference device 115 using a known absolute altitude of the reference device 115. The device 505 can then calculate the absolute altitude $Alt_c$ 135 of the user of the inertial navigational device 110 using the relative altitude $Alt_i$ 125 of the inertial navigational device 110 and the rate of change of the relative altitude $Alt_r$ 140 of the reference device 115. The absolute altitude $Alt_c$ 135 (altitude with respect to ground) of the inertial navigational device 110 can be projected on a dimensional model of the predefined area 105 displayed on the device 505. Thus, a visual depiction of the absolute altitude $Alt_c$ 135 of the inertial navigational device 110 is obtained at the device.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The inventions defined solely by the appended claims including any amendments made during the pendency of this application and all equivalents of those claims as issued.

What is claimed is:

1. A method of altitude correction of an inertial navigational device, the method comprising:
   receiving a relative altitude of the inertial navigational device;
   obtaining a rate of change of the relative altitude of a reference device; and
   calculating an absolute altitude of the inertial navigational device based on the relative altitude of the inertial navigational device and the rate of change of the relative altitude of the reference device; and
   projecting the calculated absolute altitude of the inertial navigational device on a display device.

2. The method of claim 1, wherein the receiving step further comprises:
   adjusting the relative altitude of the inertial navigational device by an altitude calibration factor corresponding to the inertial navigational device.

3. The method of claim 1, wherein the obtaining step further comprises:
   correlating a relative altitude of the reference device with an absolute altitude of the reference device to obtain the rate of change of the relative altitude of the reference device.

4. The method of claim 3, wherein the absolute altitude of the reference device is obtained from one of a historical database and a global positioning system.

5. The method of claim 3, wherein the relative altitude of the reference device is obtained based on climatic influences at the reference device.

6. The method of claim 1, wherein the absolute altitude of the inertial navigational device is calculated based on a difference between the relative altitude of the inertial navigational device and the rate of change of the relative altitude of the reference device, the rate of change of the relative altitude of the reference device being same as the rate of change of the relative altitude of the inertial navigational device.

7. The method of claim 1, wherein the relative altitude of the inertial navigational device is obtained based on a temperature and a pressure at the inertial navigational device.

8. The method of claim 1, wherein the step of projecting comprises:
   projecting the calculated absolute altitude of the inertial navigational device on a dimensional model of a predefined area displayed on the display device.

9. The method of claim 1, further comprising:
   tracking a position of a user associated with the inertial navigational device using the calculated absolute altitude of the inertial navigational device.

10. A method of altitude correction of an inertial navigational device, the method comprising:
    receiving a relative altitude of the inertial navigational device;
    correlating a relative altitude of a reference device with an absolute altitude of the reference device to obtain a rate of change of the relative altitude of the reference device;
    calculating the absolute altitude of the inertial navigational device based on the relative altitude of the inertial navigational device and rate of change of the relative altitude of the reference device; and
    projecting the calculated absolute altitude of the inertial navigational device on a display device.

11. The method of claim 10, wherein the receiving step further comprises:
    adjusting the relative altitude of the inertial navigational device by an altitude calibration factor corresponding to the inertial navigational device.

12. The method of claim 10, wherein the rate of change of the relative altitude of the reference device is calculated at predefined intervals, the rate of change of the relative altitude of the reference device being same as the rate of change of the relative altitude of the inertial navigational device.

13. The method of claim 10, wherein the step of projecting comprises:
    projecting the calculated absolute altitude of the inertial navigational device on a dimensional model of a predefined area displayed on the display device.

14. The method of claim 10, further comprising:
    tracking a position of a user associated with the inertial navigational device using the calculated absolute altitude of the inertial navigational device.

* * * * *